(12) United States Patent
Lievestro et al.

(10) Patent No.: US 7,479,214 B2
(45) Date of Patent: Jan. 20, 2009

(54) ECM TREPAN OF BARS

(75) Inventors: Terry Lievestro, West Chester, OH (US); John Reynolds, Mainville, OH (US)

(73) Assignee: Lehr Precision, Inc., Cincinnati, OH (US)

( * ) Notice: Subject to any disclaimer, the term of this patent is extended or adjusted under 35 U.S.C. 154(b) by 378 days.

(21) Appl. No.: 10/886,953

(22) Filed: Jul. 8, 2004

(65) Prior Publication Data
US 2005/0077189 A1 Apr. 14, 2005

Related U.S. Application Data

(60) Provisional application No. 60/510,041, filed on Oct. 9, 2003.

(51) Int. Cl.
*B23H 3/00* (2006.01)
(52) U.S. Cl. .................................................. 205/652
(58) Field of Classification Search ................. 205/665, 205/652
See application file for complete search history.

(56) References Cited

U.S. PATENT DOCUMENTS

| | | | | |
|---|---|---|---|---|
| 3,591,473 A | * | 7/1971 | Haggerty | 205/654 |
| 3,723,268 A | * | 3/1973 | Johns et al. | 205/643 |
| 6,387,242 B1 | * | 5/2002 | Wei et al. | 205/665 |

* cited by examiner

*Primary Examiner*—John P. Sheehan
*Assistant Examiner*—Jessee R. Roe
(74) *Attorney, Agent, or Firm*—Baker & Hostetler LLP (57) ABSTRACT

An ECM apparatus includes a stationary cathode tool having a passage, and a drive mechanism for moving a bar-shaped workpiece through the passage of the cathode tool while simultaneously rotating the workpiece. Electrolyte flows, from a manifold on one end of the cathodic tool to a manifold at the other end, through the passage, between the wall of the passage and the workpiece. An electric current is simultaneously established in the electrolyte, between the wall of the passage and the workpiece. The internal shape of the cathodic tool wall has a gradual transition from a circular entry opening to a lobed exit opening, and lobes formed in the wall of the tool are shaped so that they twist in the direction of workpiece rotation, in order to form helical lobes in the workpiece.

19 Claims, 6 Drawing Sheets

ECM TREPAN OF BARS

CROSS REFERENCE TO RELATED APPLICATION

This application claims priority from U.S. provisional application 60/510,041, filed Oct. 9, 2003.

FIELD OF THE INVENTION

This invention relates to electrochemical machining (ECM), and more specifically, to trepan machining outside contours on long bars such as bars up to seven or more meters long. Such machined bars may be used, for example, as rotors in a progressive cavity device such as a progressive cavity motor or progressive cavity pump.

BACKGROUND OF THE INVENTION

U.S. Pat. Nos. 1,892,217 and 2,028,407, to R. J. L. Moineau, disclose a gear mechanism for use as a progressive cavity pump or motor. In a typical application of progressive cavity technology, the drilling of subterranean wells, a progressive cavity motor is used as a downhole motor to convert the energy of a flowing drilling fluid to mechanical power to rotate a drill bit.

In a progressive cavity pump or motor, both the stator and the rotor are formed with helical lobes. An interference fit between the external profile of the rotor and the internal profile of the stator provides a seal isolating the cavities of the pump or motor from adjoining cavities. The seal resists the fluid pressure which results from the mechanical pumping action, or from the conversion of fluid motion to mechanical energy in a motor.

Because of the requirement for an interference fit between the rotor and stator, one or both of these components must be covered with a resilient, or dimensionally forgiving, material, usually an elastomer, which also allows the pump or motor to pass or transfer abrasive particles and other objects carried along with the fluid. Historically, the resilient material has been provided on the interior of the stator. The rotor is coated with hard chromium to increase the wear resistance of its contacting surface.

In order to minimize friction where the rotor contacts the elastomer on the inside of the stator, the rotor must have a very highly polished surface. Currently a conventional milling process is used to generate the required outside profile along the length of the rotor. A polishing operation is then carried out to change the relatively rough surface resulting from the milling operation to an acceptable finish for chrome plating. Stainless steel alloys such as 17-4PH are often used to manufacture the rotors, because of their corrosion resistance, and their relatively easy machining.

The rotors of progressive cavity pumps typically have a bearing journal at one end, and therefore cannot be shaped by extrusion. The helical lobes of the rotor typically extend from a first end toward the second end, but stop short of the second end to allow for a bearing journal and attachment features. The rotor may be solid, or may have a hole bored partially or totally through its length. Rotors with more than one lobe have multiple concave areas that stop at some point along the length of the rotor, thus limiting the ways in which they can be manufactured.

Many other bar-like products also have external profiles that do not extend along their entire length. They have concave areas that also limit the method of manufacture. Thus this invention, while described in the context of the manufacture of a rotor for a progressive cavity fluid device, has potential applications in the manufacture of various other products.

BRIEF SUMMARY OF THE INVENTION

The apparatus in accordance with the invention comprises a cathodic tool having a through passage for receiving a workpiece. The passage has an entry opening and an exit opening, the entry opening corresponding in shape to, and being slightly larger than, the cross-section of the workpiece, and the exit opening corresponding in shape to, and being slightly larger than, the cross-section of the desired finished product. The cross-sectional shape of the through passage has a gradual transition from the shape of the entry opening to the shape of the exit opening, along the length of the through passage. A manifold, connected to the cathodic tool adjacent the exit opening, directs electrolyte through the through passage, about a workpiece moving through the through passage. A drive mechanism moves the workpiece through the passage and the manifold. Supports are provided for holding the workpiece as it moves through the cathodic tool, and an electric power supply is connected to the cathodic tool and connectible to the workpiece.

In a preferred embodiment of the invention, the above-mentioned manifold is a first manifold connected to the cathodic tool adjacent the exit opening, and a second manifold is connected to the cathodic tool adjacent the entry opening. The manifold adjacent the exit opening has a seal conforming to the desired cross-sectional shape of the finished product. The first manifold, which is located adjacent the exit opening of the cathodic tool, receives electrolyte from a supply, and directs the electrolyte into the through passage of the cathodic tool about the workpiece therein. A path is provided for circulating electrolyte from the second manifold to an electrolyte holding tank, from which it can be returned through the first manifold to the cathodic tool.

For producing a product having lobes, the opening of the through passage of the cathodic tool is circular, and the exit opening has a lobed cross-sectional shape. The through passage has lobes that gradually increase in size, proceeding in the direction from the entry opening to the exit opening.

For producing product having helical lobes, such as a rotor for a progressive cavity pump or motor, the drive mechanism includes a mechanism for rotating the workpiece about an axis along its length as the workpiece is moved through the passage of the cathodic tool, and the passage of the cathodic tool has lobes that both gradually increase in size, and twist about the axis of rotation of the workpiece, proceeding in the direction from the entry opening to the exit opening.

The electrochemical trepan machining of a workpiece in accordance with the invention is carried out by driving the workpiece through a cathodic tool having a through passage for receiving the workpiece, the passage having an entry opening and an exit opening, the entry opening corresponding in shape to, and being slightly larger than, the cross-section of the workpiece, and the exit opening corresponding in shape to, and being slightly larger than, the cross-section of the finished product. The cross-sectional shape of the through passage has a gradual transition from the shape of the entry opening to the shape of the exit opening, along the length of the through passage. Electrolyte is provided in the through passage of the cathodic tool, about the workpiece as the workpiece moves though said through passage, and an electric current is established through the electrolyte, between the workpiece and the cathodic tool, as the workpiece is driven through the cathodic tool.

Preferably, the electrolyte is caused to flow through the through passage, within a space between an interior wall of the cathodic tool and the workpiece.

In producing a product having an integral bearing journal, the workpiece initially has a circular, cylindrical cross-section, and the movement of the workpiece is stopped before the entire workpiece is driven into the cathodic tool, leaving a circular, cylindrical portion of the workpiece for use as a bearing journal.

In accordance with the invention, electrochemical machining (ECM) eliminates the need for milling, and eliminates, or at least significantly reduces, the need for polishing prior to chromium plating. A near reverse image of the desired outside profile is machined into the inside of a cathodic tool.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
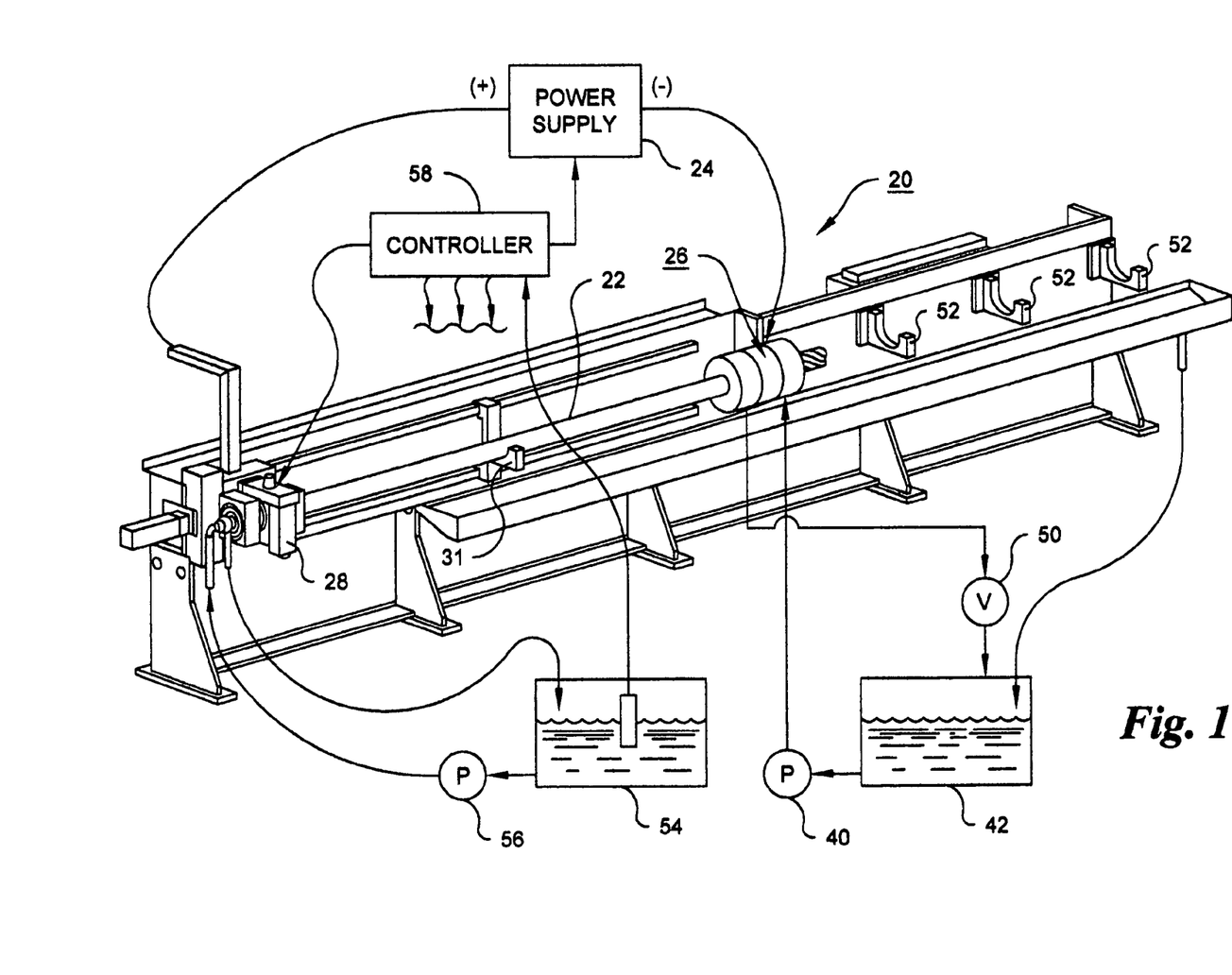
FIG. 1 is an isometric, schematic view of an ECM apparatus in accordance with a preferred embodiment of the invention.

In the ECM apparatus 20, illustrated in FIG. 1, a workpiece 22, in the form of long bar, is machined into a rotor for a progressive cavity pump. The workpiece is preferably machined from a stainless steel alloy such as 17-4PH.

The apparatus 20 is similar to the machine described in U.S. Pat. No. 6,143,407, the disclosure of which is here incorporated by reference. The machine of U.S. Pat. No. 6,143,407 is reconfigured to allow for the moving workpiece 22 to be connected to the positive side of a power supply 24, so that it becomes an anode, while the negative side of the supply is connected to a stationary cathodic tool 26. The cathodic tool must be held stationary, and adequate supports (not shown) must be provided to carry the workpiece 22 before and after it passes through the cathodic tool. The machine should be of a size sufficient to accommodate a workpiece about 7 meters or more in length. Both the moving workpiece and the fixed cathodic tool must be electrically insulated from machine frame to prevent short circuits.

The workpiece 22, which has a high ratio of length to maximum cross section dimension, has its proximal end mounted in a drive 28 arranged to move along an axis extending lengthwise, and to rotate the workpiece about the axis, under computer control. The drive 28 should be capable of carrying an electric current up to about 30,000 Amperes to the workpiece while effecting simultaneous rotation and translation of the workpiece. The power supply voltage is typically a voltage up to about 25 volts DC. The distal end 32 of the workpiece extends into manifold 30 (FIG. 2) of the cathodic tool 26, which serves as the electrolyte outlet manifold, and is supported along its length by one or more suitable supports, such as support 31, to prevent it from sagging.

The machining of a progressive cavity pump rotor, using the apparatus of FIG. 1 may be carried out using a voltage in the range from about 10 to 25 volts DC, typically 18 volts. The feed rate of the workpiece should be in the range of about 0.2 to 1 inch per minute, depending on the cross sectional area to be removed. A typical feed rate is 0.75 inch per minute. The current is approximately 10,000 Amperes for each cubic inch of material removed per minute. The capability of the power supply may vary from application to application as required.

A typical electrolyte is a water solution of sodium chloride (NaCl) at a concentration of 1.1 pounds gallon of water. In practice, the concentration may be varied from about 0.5 pounds per gallon to about 2.5 pounds per gallon of water. An alternate electrolyte composition can be a water solution of sodium nitrate ($NaNO_3$) at a concentration in the range from about 0.5 to about 3.0 pounds per gallon of water. Mixtures of $NaNO_3$ and NaCl may also be used, as can many other suitable electrolytes.

Figure 2:
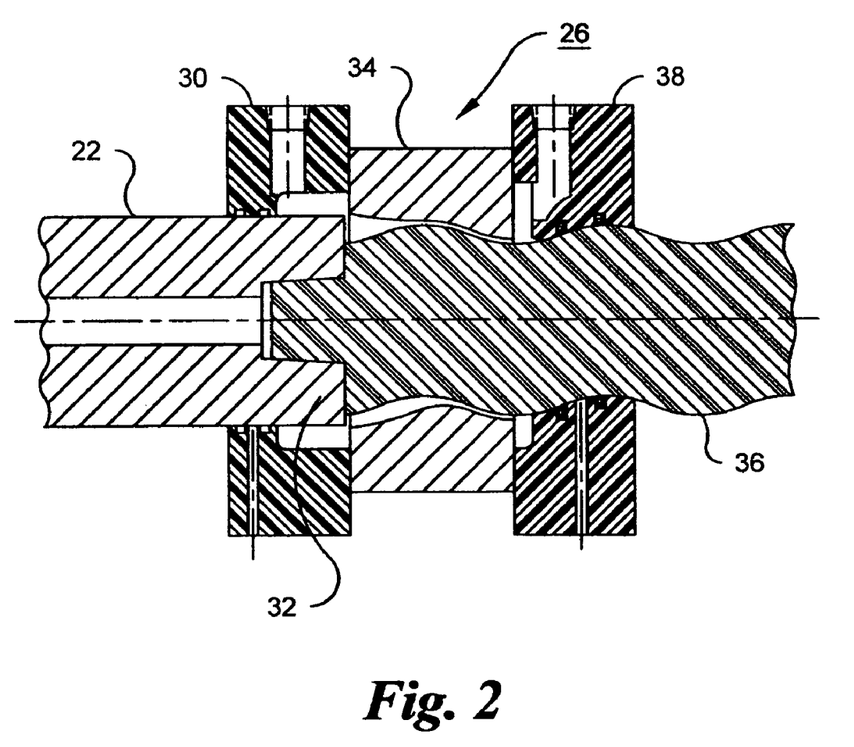
FIG. 2 is an axial section through a cathodic tool and associated seals, showing the workpiece at its initial position.

As shown in FIG. 2, the electrolyte outlet manifold 30 is attached to a tapered cathodic electrode 34, and is used to expel the electrolyte for the ECM process. The manifold 30 locates and centers the workpiece as it enters the cathodic tool, and provides a seal around the initial, unmachined, circular, cylindrical contour of the workpiece, while receiving electrolyte flowing out of the cathodic electrode. A blank 36, having an external shape corresponding to that of the final machined rotor, is secured to the distal, or leading, end 32 of the workpiece 22. This blank extends through the cathodic tool 34, and through an electrolyte entry manifold 38, attached to the end of the cathodic tool on the side opposite from manifold 30. The blank 36 passes through suitably shaped seals in the exit manifold 38, and prevents flow of electrolyte past the seals as the distal end 32 of the workpiece approaches the seals. The blank may be made of a suitable synthetic resin such as the acetal resin known by the trademark DELRIN, or PTFE. Alternatively, the blank may be a metal such as Niobium that has a breakdown potential far in excess of the breakdown potential for ordinary workpieces during the ECM process.

The electrolyte inlet manifold 38 is supplied with electrolyte from an electrolyte pump 40, shown in FIG. 1, which receives electrolyte from a holding tank 42. Electrolyte is returned to the holding tank 42 from the electrolyte outlet manifold 30 through a pressure control valve 50.

Figure 7:
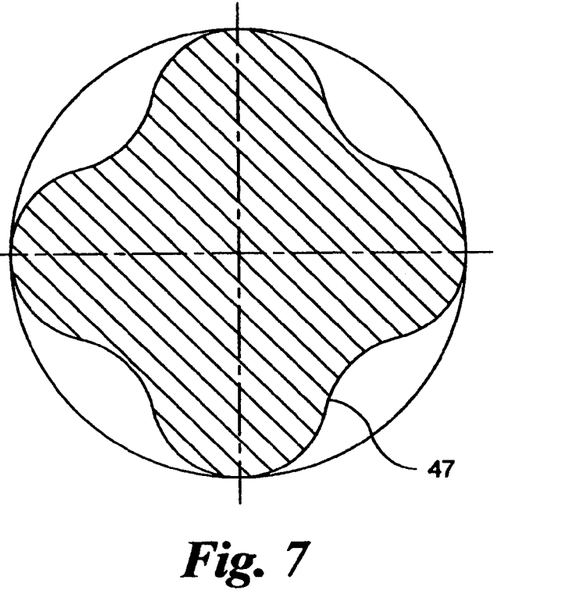
FIG. 7 is a schematic radial section of a typical rotor for a progressive cavity pump or motor.
Figure 8:
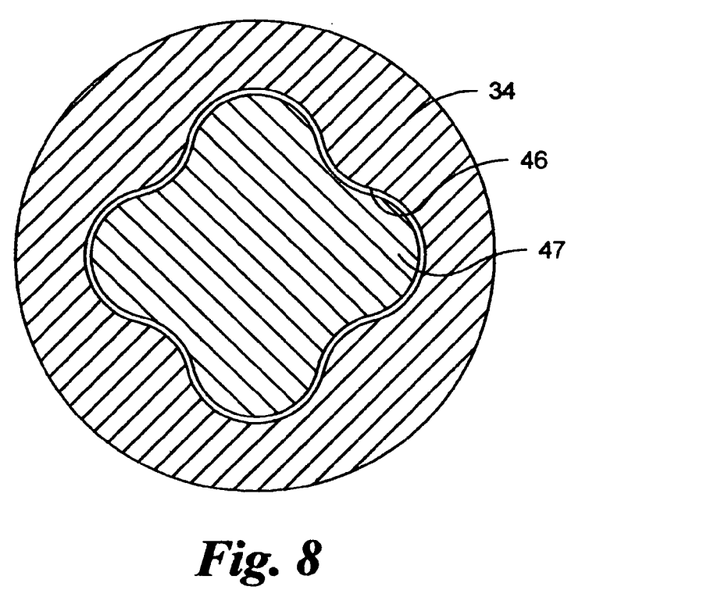
FIG. 8 is a radial sectional view showing the rotor being formed as it passes out of an ECM cathodic tool.
Figure 9:
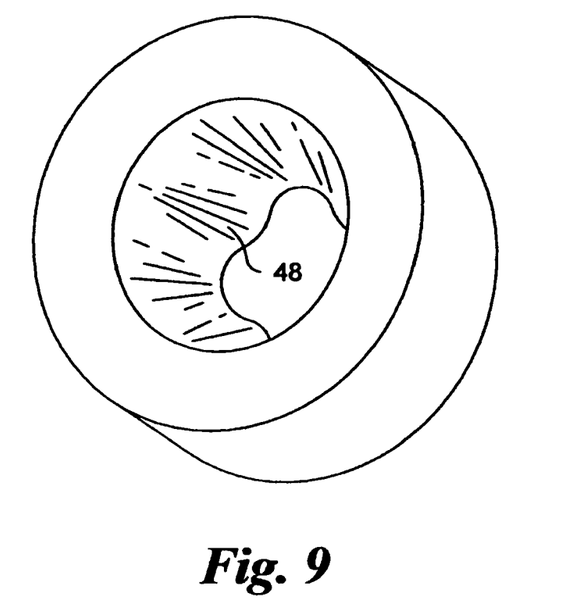
FIG. 9 is a schematic, isometric, view of a typical cathodic tool for generating four straight, parallel lobes from a round bar, showing the cutting face profiles only, other features being suppressed for clarity.
Figure 10:
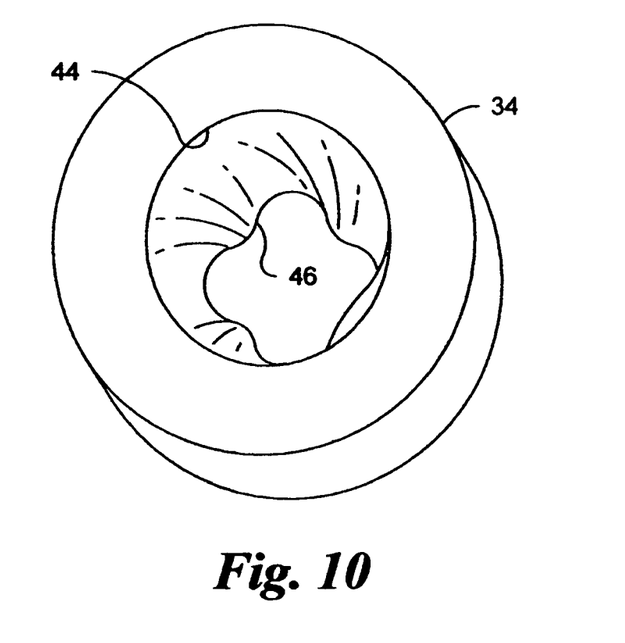
FIG. 10 is a schematic, isometric, view of a cathodic tool for generating the four helical lobes of a rotor for a progressive cavity pump or motor from a round bar, showing the cutting face profiles only, other features being suppressed for clarity.

As shown in FIG. 2, after passing through the inlet manifold 38, the workpiece 22 moves, with electrolyte flowing over it, through the cathodic tool 34. As shown in FIG. 10, the cathodic tool 24 has a generally round entry opening 44 corresponding to the shape of the workpiece, and its interior gradually transforms to a four-lobed exit opening 46, corresponding to the desired configuration of the rotor 47, as shown in FIG. 7. The profile of the exit opening 46 of the cathodic tool, as shown in FIG. 8, is slightly larger than the desired cross section of the workpiece. In the case of a rotor for a progressive cavity pump, the interior surface of the cathodic tool has a twisted configuration as shown in FIG. 10. However, for producing straight lobes or flutes, the shape of the interior of the cathodic tool can have the straight through configuration shown in FIG. 9, where the interior surface 48 can be generated by straight lines intersecting a single point on a central axis. The cathodic tool is constructed from a conductive material such as a material consisting of 70% tungsten and 30% copper. The cathodic tool acts as a trepan tool used in milling and drilling operations except that no mechanical cutting action is required, and the shape of the product can have a complex contour, whereas only circular shapes can be produced with conventional trepan machining.

Figure 2A:
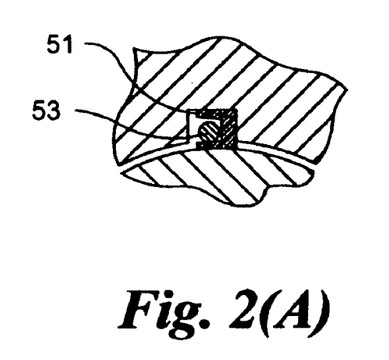
FIG. 2(A) is an enlarged portion from FIG. 2, showing details of a seal structure.
Figure 3:
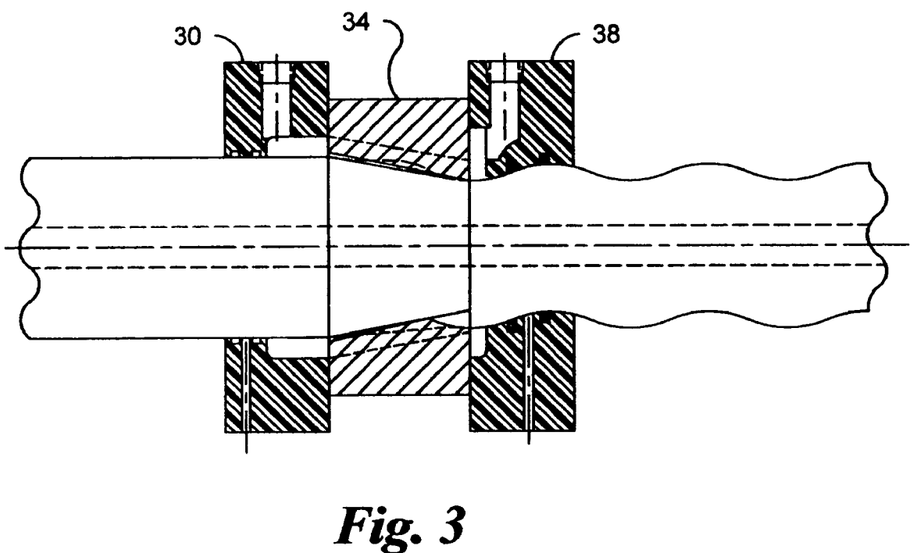
FIG. 3 is an axial sectional view through the cathodic tool and seals, illustrating a mid point of the machining process.

The electrolyte inlet manifold 38, which is connected to the electrolyte pumping system, is required to seal on the finish-machined profile of the workpiece. The seals in manifold 38 are shaped to match the helical lobes of the product. As shown in FIG. 2A, these seals are provided with grooves, each having a cup type lip 51, in which a compliant spring 53 is installed, to assist the internal pressure of the electrolyte in forcing contact between the seals and the profiled surface of the finished workpiece. Pressure and temperature of the electrolyte in the electrolyte recirculation path may be controlled by temperature and pressure transducers, pressure regulators and heat exchangers (not shown).

As the workpiece moves out of manifold 38, it is cantilevered. If the workpiece were unsupported, its leverage would cause a large amount of stress on both manifolds. FIG. 1 illustrates supports 52 on the machine frame, which prevent the stress on the manifolds from becoming too large. The supports 52 carry the weight of the distal portion of the workpiece. These supports may either move with the workpiece, or may be made of a suitable material to avoid damage to the finish-machined profile of the workpiece. In a preferred embodiment, steel supports, having non-metallic wear plates for contact with the workpiece, are used. After completion of the electrochemical machining operation, the machined workpiece is backed out of the cathode assembly.

In an alternative embodiment of the invention electrolyte is caused to flow in the same direction in which the workpiece travels in the machining operation. In this case, electrolyte is pumped through manifold 30, flows in the distal direction between the workpiece and the cathodic tool, and out through the manifold 38 for recirculation.

In some applications, another alternative is to allow the electrolyte to flow through the cathodic tool and exit without passing through an exit manifold. This may be required in cases where the profile of the finish machined workpiece has relatively sharp corners, or is otherwise shaped so that it does not provide a good sealing surface that can be sealed by seals in an exit manifold. A gravity drain system would then be required to return the electrolyte to the pumping system. The flow rates should be high enough to create a back pressure to force flow across the entire area, as shown in FIG. 7, between the inside surface 46 of the cathode, and the outside profile of the workpiece.

Figure 4:
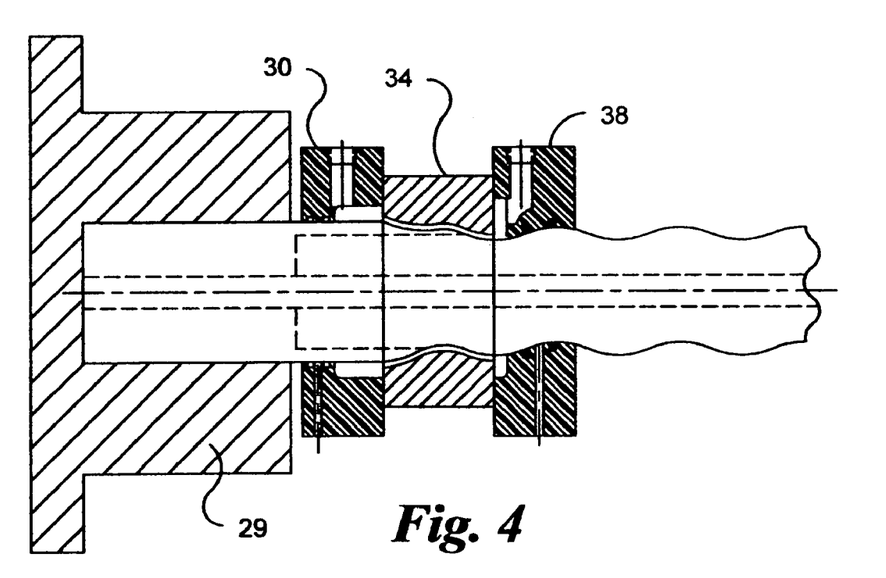
FIG. 4 is an axial section through the cathodic tool and seals, illustrating the workpiece at the final position of the machining process.

Heat is generated because of the high electric current in the apparatus. The heat must be removed to maintain a stable system. As shown in FIG. 1, a separate holding tank 54 and pump 56 are used to supply cool water to remove heat. Water is also pumped through the power supply 24 and the conductive cables that connect the power supply to the cathodic tool and the workpiece. Water is also used to cool the part holder 29, shown in FIG. 4. The holding tank 54 is maintained at a fixed temperature by using a temperature control system (not shown) and a heat exchanger (not shown) that isolates the temperature control system from the electrolyte.

The ECM process is one that uses an electrical potential to break down the water ($H_2O$) into a hydroxide ($OH^-$) ion that joins with a metal ion to form a metal hydroxide such as $Fe(OH)_2$. Hydrogen gas is formed in the process, and must be removed from the machining system to prevent gas bubbles from forming an electrically insulating obstruction to the process. Controlling the pressure of the electrolyte entering through the electrolyte inlet manifold, and the pressure at the electrolyte outlet manifold, allows for control of both the electrolyte flow rate, and the pressure within the ECM cell, to limit the formation of gas. Higher pressure in the outlet manifold also helps force electrolyte around contours that would otherwise cause cavitations in the electrolyte.

The apparatus is operated by a controller 58, which performs multiple functions. The controller programs the translation and rotation of the workpiece to produce the helical shapes required in the case of a rotor having helical lobes for use in a progressive cavity fluid mechanism. The controller also maintains the proper voltage, taking into account the feed rate and the amount of material to be removed. It also controls proper timing of voltage changes. Other electrolyte functions such as the operation of pumps, pressure regulation, and temperature regulation, are also controlled by the controller.

Figure 5:
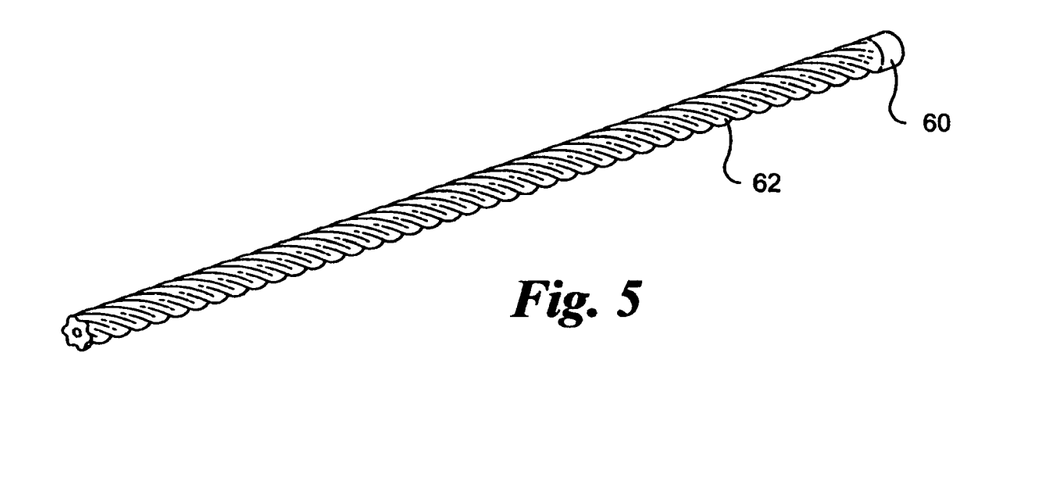
FIG. 5 is an isometric view of a the full length of a typical rotor for use in a progressive cavity pump or motor.
Figure 6:
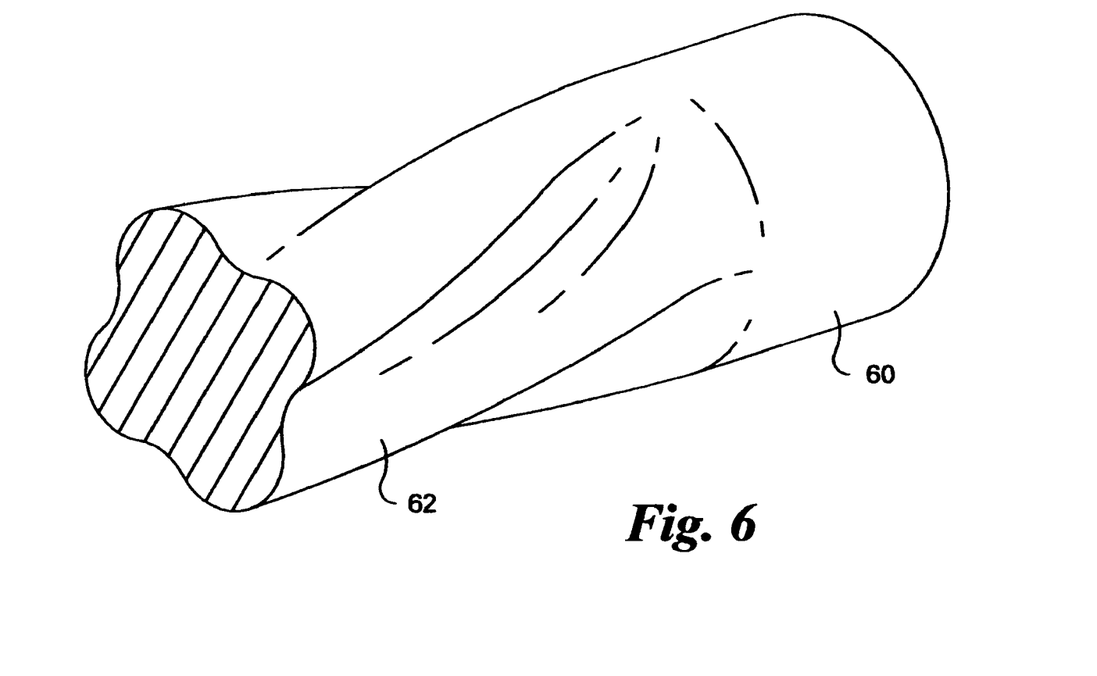
FIG. 6 is a detailed isometric view of an end portion of a typical rotor, showing the transition from a helical lobe profile to a bearing journal.

The progress of a circular, cylindrical, workpiece through the cathodic electrode can be stopped at a point such that a short cylindrical portion is left at the proximal end of the workpiece, as shown in FIGS. 5 and 6. The short cylindrical portion 60, and the part 62 having helical lobes remain joined as a unitary element. The cylindrical portion can be ground and plated, and used as a bearing journal for the rotor.

Various modifications can be made to the apparatus and method described. For example, instead of pushing the workpiece through the cathodic tool, the workpiece may be pulled through the tool, by using a suitable attachment at the distal end of the workpiece. It may be desirable to pull rather than push the workpiece where the cross section of the workpiece is so weak that there is a risk of buckling.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the inventions as described and differentiated in the following claims.

We claim:

1. An apparatus for electrochemical trepan machining of a workpiece having a large length-to-diameter ratio, to a desired product, the apparatus comprising:

a cathodic tool having a through passage for receiving a workpiece, the passage having an entry opening and an exit opening, the entry opening corresponding in shape to, and being slightly larger than, the cross-section of the workpiece, and the exit opening corresponding in shape to, and being slightly larger than, the cross-section of the desired finished product, the cross-sectional shape of the through passage having a gradual transition from the shape of the entry opening to the shape of the exit opening, along the length of the through passage;

a manifold connected to the cathodic tool adjacent one of said entry and exit openings for directing electrolyte through said through passage of the cathodic tool, about a workpiece moving through said through passage;

a drive mechanism that moves the workpiece through said passage of the cathodic tool and said manifold, such that a first amount of material may be removed from a first predetermined portion of the workpiece at a first rate of removal and a second amount of material may be removed from a second predetermined portion of the workpiece at a second rate of removal;

supports for holding the workpiece as it moves through the cathodic tool; and an electric power supply connected to the cathodic tool and connectible to the workpiece, wherein the drive mechanism stops the movement of the workpiece through the cathodic tool at a predetermined position along the workpiece, wherein the stop of the movement of the workpiece provides a bearing journal.

2. An apparatus according to claim 1, wherein said manifold is a first manifold connected to the cathodic tool adjacent one of said entry and exit openings thereof, and having a second manifold connected to the cathodic tool adjacent the other of said entry and exit openings thereof, the manifold adjacent the exit opening having a seal conforming to the desired cross-sectional shape of the finished product, wherein said second manifold receives electrolyte before said electrolyte passes through said through passage of the cathodic tool about a workpiece therein, and having a path for recirculating electrolyte from said first manifold to said second manifold.

3. An apparatus according to claim 1, wherein the entry opening of said through passage of the cathodic tool is circular, the exit opening of the cathodic tool has a lobed cross-sectional shape, and the through passage of the cathodic tool has lobes that gradually increase in size, proceeding in the direction from said entry opening to said exit opening.

4. An apparatus according to claim 1, wherein the drive mechanism includes a mechanism for rotating the workpiece about an axis along its length as the workpiece is moved through said passage of the cathodic tool, the entry opening of said through passage of the cathodic tool is circular, the exit opening of the cathodic tool has a lobed cross-sectional shape, and the through passage of the cathodic tool has lobes that both gradually increase in size, and twist about said axis, proceeding in the direction from said entry opening to said exit opening.

5. An apparatus according to claim 1, wherein the drive mechanism provides rotational and linear movement that supports and locates the workpiece.

6. An apparatus according to claim 1, wherein the drive mechanism rotates the workpiece about an axis along the workpiece's length as the workpiece is moved through said through passage of the cathodic tool.

7. An apparatus according to claim 6, wherein the entry opening of said through passage of the cathodic tool is circular, said exit opening of the cathodic tool has a lobed cross-sectional shape, and said through passage of the cathodic tool has lobes that both gradually increase in size, and twist about said axis, as said through passage extends from said entry opening to said exit opening.

8. An apparatus according to claim 1, wherein the bearing journal includes a cylindrical portion of the workpiece.

9. An apparatus according to claim 1, wherein the workpiece and the cathodic tool are electrically insulated from a frame of the apparatus and wherein said insulation prevents the likelihood of short circuits.

10. An apparatus according to claim 1, further comprising an electrolyte pumping system.

11. An apparatus for electrochemical trepan machining of a workpiece having a large length-to-diameter ratio, to a desired product, the apparatus comprising:

a cathodic tool having a through passage for receiving a workpiece, the passage having an entry opening and an exit opening, the entry opening corresponding in shape to, and being slightly larger than, the cross-section of the workpiece, and the exit opening corresponding in shape to, and being slightly larger than, the cross-section of the desired finished product, the cross-sectional shape of the through passage having a gradual transition from the shape of the entry opening to the shape of the exit opening, along the length of the through passage;

a manifold connected to the cathodic tool adjacent one of said entry and exit openings for directing electrolyte through said through passage of the cathodic tool, about a workpiece moving through said through passage;

a drive mechanism that moves the workpiece through said passage of the cathodic tool and said manifold, such that a first amount of material may be removed from a first predetermined portion of the workpiece at a first rate of removal and a second amount of material may be removed from a second predetermined portion of the workpiece at a second rate of removal;

supports for holding the workpiece as it moves through the cathodic tool; and an electric power supply connected to the cathodic tool and connectible to the workpiece, further comprising a blank which extends through the cathodic tool.

12. An apparatus according to claim 11, wherein said manifold is a first manifold connected to the cathodic tool adjacent one of said entry and exit openings thereof, and having a second manifold connected to the cathodic tool adjacent the other of said entry and exit openings thereof, the manifold adjacent the exit opening having a seal conforming to the desired cross-sectional shape of the finished product, wherein said second manifold receives electrolyte before said electrolyte passes through said through passage of the cathodic tool about a workpiece therein, and having a path for recirculating electrolyte from said first manifold to said second manifold.

13. An apparatus according to claim 11, wherein the entry opening of said through passage of the cathodic tool is circular, the exit opening of the cathodic tool has a lobed cross-sectional shape, and the through passage of the cathodic tool has lobes that gradually increase in size, proceeding in the direction from said entry opening to said exit opening.

14. An apparatus according to claim 11, wherein the drive mechanism includes a mechanism for rotating the workpiece about an axis along its length as the workpiece is moved through said passage of the cathodic tool, the entry opening of said through passage of the cathodic tool is circular, the exit opening of the cathodic tool has a lobed cross-sectional shape, and the through passage of the cathodic tool has lobes that both gradually increase in size, and twist about said axis, proceeding in the direction from said entry opening to said exit opening.

15. An apparatus according to claim 11, wherein the drive mechanism provides rotational and linear movement that supports and locates the workpiece.

16. An apparatus according to claim 11, wherein the drive mechanism rotates the workpiece about an axis along the workpiece's length as the workpiece is moved through said through passage of the cathodic tool.

17. An apparatus according to claim 11, wherein the entry opening of said through passage of the cathodic tool is circular, said exit opening of the cathodic tool has a lobed cross-sectional shape, and said through passage of the cathodic tool has lobes that both gradually increase in size, and twist about said axis, as said through passage extends from said entry opening to said exit opening.

18. An apparatus according to claim 11, wherein the workpiece and the cathodic tool are electrically insulated from a frame of the apparatus and wherein said insulation prevents the likelihood of short circuits.

19. An apparatus according to claim 11, further comprising an electrolyte pumping system.

\* \* \* \* \*